Dec. 26, 1967 P. BECKMAN 3,360,404
GRID TYPE THERMOCOUPLE
Filed Oct. 8, 1962
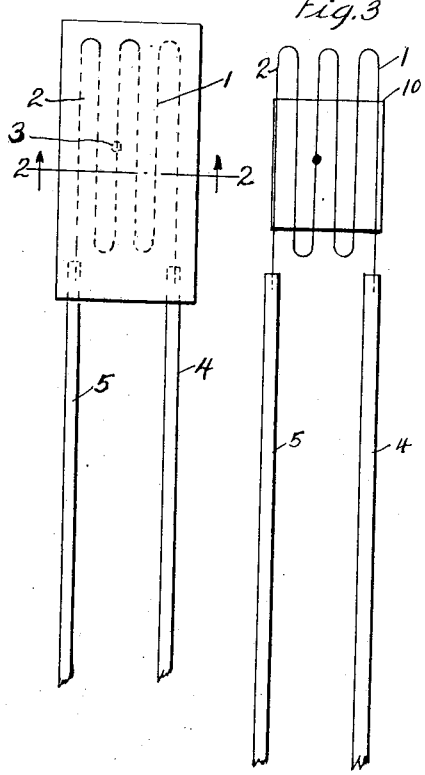
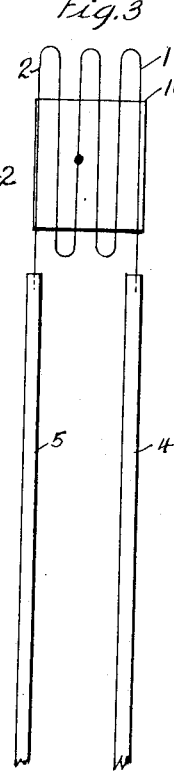
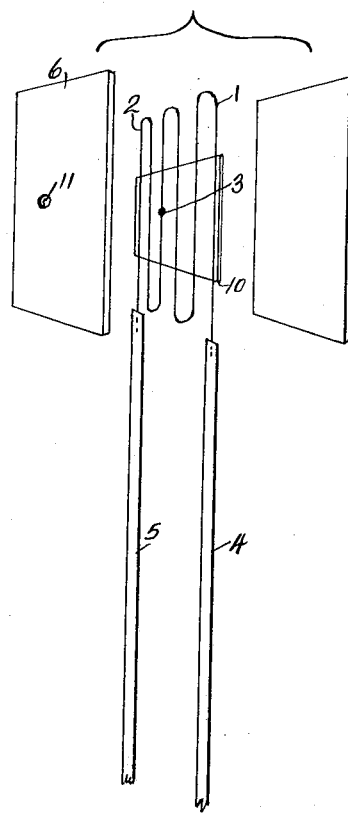
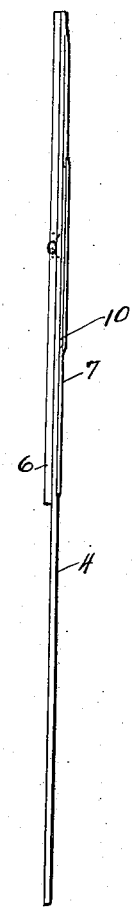
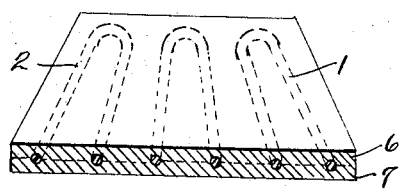
INVENTOR.
Paul Beckman
BY
Attorney

United States Patent Office 3,360,404
Patented Dec. 26, 1967

3,360,404
GRID TYPE THERMOCOUPLE
Paul Beckman, 944 Henrietta Ave.,
Huntingdon Valley, Pa. 19006
Filed Oct. 8, 1962, Ser. No. 229,060
3 Claims. (Cl. 136—230)

This invention relates to thermocouples for surface temperature measurements.

While many attempts have been made to provide surface temperature sensors, yet they have been deficient either structurally, functionally, or economically. One of the major difficulties in temperature measurement has been that of obtaining accurate data from surface temperature measurements on thermally non-conductive materials. These difficulties have been related to the inability to provide the maximum amount of thermocouple wire within a limited surface area whose temperature is to be measured so that thermal energy is not dissipated.

It is an object of my invention to provide an improved surface temperature-sensing unit that will provide a high degree of accuracy and sensitivity in sensing surface temperatures with a minimum local change in the test body's surface temperature.

Another object is to provide such an improved surface temperature-sensing unit that is relatively simple and economical in construction combined with the desired functional characteristics.

Another object is to provide an improved temperature sensor that can be readily adapted to measuring temperatures of various types of materials.

Other objects and advantages will be more apparent to those skilled in the art from the following description of the accompanying drawings in which:

FIG. 1 is a plan view of my improved sensor;

FIG. 2 is a fragmentary perspective through the body of the sensor taken substantially on the line 2—2 of FIG. 1;

FIGS. 3 and 4 are respectively a plan view and perspective of successive stages of construction; and FIG. 5 is an edge elevation of my improved sensor.

In the particular embodiment of the invention disclosed herein, I have provided a pair of thermocouple wires 1 and 2 arranged in grid formation consisting of parallel portions connected in series at their alternate ends. The thermocouple junction 3 is disposed substantially half way between the ends of the grid connections. The lengths of the sensor wires 1 and 2 may either be calculated by means of well-known heat transfer equations or made to provide more than ample isolation of the thermocouple junction from the respective leads 4 and 5. For the heat transfer equation see, for example, "Heat Transfer" by William H. McAdams published by McGraw Hill, 1954. As is customary, the leads 4 and 5 are of the same material as the sensor wires 1 and 2 to which they are connected. The grid is supported between front and back sheets 6 and 7 preferably of film thickness and usually of the same material as the structure on which temperature is to be measured. For example, the sheets 6 and 7 may be of polyester film, Cellophone, poly-methyl-methacrylate, etc. These materials have the difficulty that they have low thermal conductivity which creates the problem of properly determining their surface temperature. The parallel strands of the grid are initially held in their relative positions by a thin plastic film 10 which is preferably made by applying a hardenable plastic liquid such as epoxies or cellulose nitrates. The sub-assembly is then laminated between front sheet 6 and back sheet 7. This lamination can be accomplished either by adhesives applied to the inner faces of the inner sheets 6 and 7 or they may be thermally-compression bonded. The front sheet 6 has a hole 11 in alignment with the junction 3 so that the normally enlarged junction of the two wires will partially extend into hole 11 and thereby bring the junction into proximity of the surface of the structure whose temperature is to be measured. The inner ends of the leads 4 and 5 are preferably within the lamination to provide strength. As is shown in the drawings, FIGURE 5 for example, the junction is not offset in relation to the laminated thermocouple assembly and is instead arranged to lie within its confines.

While the foregoing construction with the front and back sheet is particularly adapted for measuring temperatures of plastic structures, yet in case of ceramic structures, these sheets are omitted and the grid type thermocouple is cemented directly to the structure by any well-known ceramic cement. Because the thermocouple wires are extremely delicate, usually about .001″ in diameter, the technique for a ceramic application is to first cement down the looped ends and a portion of the leads to the ceramic structure and then dissolve the film 10 by an appropriate solvent, such for example, as acetone, or cellulose nitrate, or well-known commercial strippers where epoxy materials are employed.

From the foregoing disclosure, it is seen that I have provided an improved temperature sensor that overcomes the disadvantages of prior sensing device and is relatively simple and economical in manufacture combined with a high degree of accuracy and sensitivity. It can be seen that my novel arrangement provides for an extremely low temperature measurement error through thermal conductivity in the sensor wires, while confining the area of installation to a relatively small size.

It will, of course, be understood that various changes in details of construction and arrangement of parts may be made by those skilled in the art without departing from the spirit of the invention, as set forth in the appended claims.

I claim:

1. A substantially flat surface temperature sensor in which a thermocouple junction is well isolated thermally from electrical leads therefor, comprising a pair of extremely delicate thermocouple wires having ends disposed for connection with the electrical leads for the sensor, said wires being of substantially the same length formation consisting of substantially parallel portions connected in series at their alternate ends, a single thermocouple junction only disposed substantially midway between said ends of said wires disposed for connection with the leads and holding means including electrically insulating material secured to said wires and holding said portions together in said grid formation as a laminar structure with said junction within the confines of said laminar structure.

2. A surface temperature sensor as set forth in claim 1 wherein said holding means includes two thin broad-area members disposed on opposite side of said grid formation to form a laminated thermocouple assembly therewith, and wherein said thermocouple wires are of the order of about a thousandth of an inch in diameter.

3. A surface temperature sensor in which a thermocouple junction is well isolated thermally from electrical leads therefor, comprising a pair of extremely delicate thermocouple wires having ends disposed for connection with electrical leads for the sensor, said wires being of substantially the same length and arranged in a grid formation consisting of substantially parallel portions connected in series at their alternate ends and disposed in substantially the same plane, a single thermocouple junction only disposed substantially in said plane substantially midway between said ends of said wires disposed for connection with the leads, said junction being enlarged in relation to the diameter of said wires, and electrically insulating material bonded with said wires and holding said wires together in said grid formation, said material including two sheets of electrically insulating material bonded with said grid formation therebetween to form a laminated thermocouple, one of said sheets having a hole in alignment with said enlarged junction, said enlarged junction extending at least partially into the hole and being within the confines of said laminated thermocouple whereby said junction is disposed to be brought into proximity with a surface the temperature of which is to be measured and against which the said one of said sheets is applied.

References Cited
UNITED STATES PATENTS

| | | | |
|---|---|---|---|
| 2,798,493 | 7/1957 | Sukacev | 136—230 X |
| 2,798,494 | 7/1597 | Sukacev | 136—225 |
| 3,031,888 | 5/1962 | Wilhelm. | |
| 1,289,116 | 12/1918 | Chubb | 136—233 |
| 2,694,098 | 11/1954 | Leins | 136—225 |
| 2,703,335 | 3/1955 | Andrus | 136—224 |
| 2,768,424 | 10/1956 | Andrus | 136—232 X |
| 3,082,508 | 3/1963 | Te Velde. | |

ALLEN B. CURTIS, *Primary Examiner.*

WINSTON A. DOUGLAS, *Examiner.*